(12) United States Patent
Ito et al.

(10) Patent No.: US 6,946,785 B2
(45) Date of Patent: Sep. 20, 2005

(54) OXIDE COMPOSITE PARTICLE AND METHOD FOR ITS PRODUCTION, PHOSPHOR AND METHOD FOR ITS PRODUCTION, COLOR FILTER AND METHOD FOR ITS MANUFACTURE, AND COLOR DISPLAY

(75) Inventors: Takeo Ito, Saitama (JP); Koji Washiyama, Saitama (JP); Tsuyoshi Oyaizu, Saitama (JP); Hiroshi Makihara, Tokyo (JP); Toshimi Fukui, Shiga (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 135 days.

(21) Appl. No.: 10/239,847

(22) PCT Filed: Apr. 6, 2001

(86) PCT No.: PCT/JP01/02975

§ 371 (c)(1),
(2), (4) Date: Oct. 1, 2002

(87) PCT Pub. No.: WO01/77233

PCT Pub. Date: Oct. 18, 2001

(65) Prior Publication Data

US 2004/0212290 A1 Oct. 28, 2004

(30) Foreign Application Priority Data

Apr. 6, 2000 (JP) ........................................ 2000-105315

(51) Int. Cl.$^7$ ............................................... H01J 29/10
(52) U.S. Cl. ...................... 313/461; 313/467; 313/479; 252/301.4 R
(58) Field of Search ................... 252/301.4 R; 313/461, 313/467, 474, 477 R, 478–479, 486, 112

(56) References Cited

U.S. PATENT DOCUMENTS 5,051,394 A * 9/1991 Haruta et al. ............... 502/324
5,616,986 A * 4/1997 Jacobsen et al. ............ 313/461
5,989,624 A * 11/1999 Kida et al. .................. 427/125
6,479,928 B1 * 11/2002 Lee et al. .................... 313/461

FOREIGN PATENT DOCUMENTS

| JP | 01179732 A | * 7/1989 | ............. C03B/8/02 |
| JP | 1-215865 | 8/1989 | |
| JP | 3-26781 | 2/1991 | |
| JP | 5-57192 | 3/1993 | |
| JP | 7-3259 | 1/1995 | |
| JP | 2000-160212 | 6/2000 | |
| WO | 98/18149 | 4/1998 | |

* cited by examiner

*Primary Examiner*—Nimeshkumar D. Patel
*Assistant Examiner*—German Colón
(74) *Attorney, Agent, or Firm*—Oblon, Spivak, McClelland, Maier & Neustadt, P.C.

(57) ABSTRACT

An oxide composite particle of the present invention is composed of at least one fine gold particle contained in a matrix of an oxide particle or at least one fine gold particle supported fixedly on the surface of an oxide particle, and absorbs a visible light having a specific wavelength. A phosphor of the invention has a thin film which is composed of such oxide composite particles on the surface of a phosphor particle of red or the like. The phosphor can be obtained by mixing phosphor particles into a dispersion of gold colloid/oxide composite particles, agitating the resultant mixture, and taking out the precipitated phosphor particles, followed by drying. Further, in a color filter of the invention, a filter layer of at least one color formed on an inner surface of a panel is a thin film composed of the above-described oxide composite particles. This provides a phosphor or color filter which is excellent in optical characteristics, heat resistance and non-toxicity and never interferes with the irradiation of a photoresist with ultraviolet rays, and realizes a color display which exhibits good luminous chromaticity and is excellent in brightness and contrast.

11 Claims, 6 Drawing Sheets

OXIDE COMPOSITE PARTICLE AND METHOD FOR ITS PRODUCTION, PHOSPHOR AND METHOD FOR ITS PRODUCTION, COLOR FILTER AND METHOD FOR ITS MANUFACTURE, AND COLOR DISPLAY

This application is a 371 application of PCT/JP01/02975, filed Apr. 06, 2001.

TECHNICAL FIELD

The present invention relates to an oxide composite particle usable as a pigment which is excellent in heat resistance and light resistance and has a high color purity, and a method for its production, a phosphor and a method for its production, a color filter and a method for its manufacture, color displays such as a color cathode ray tube, a field emission display (FED), a plasma display panel (PDP) and the like including the above.

BACKGROUND

Generally, phosphor layers of blue, green and red are arranged in the shape of dots or stripes on an inner surface of a face panel of a color display such as a color cathode ray tube, and electron beams collide with the phosphor layers to cause their phosphors to emit light in respective colors, thereby displaying an image.

Conventionally, for the purpose of improving the brightness, contrast and luminous chromaticity of such a color display, there has been employed a method of coating the surface of a phosphor particle with pigment particles of each color which transmit light of the same color as its luminous color, or a method of providing, between a phosphor layer and a face panel, a color filter composed of a pigment layer of each color which transmits light of the same color as the luminous color of the phosphor layer.

It is possible to use an organic or inorganic pigment as a phosphor coating or color filter forming pigment, but there is a limit in usable pigments because of their optical characteristics, heat resistance or toxicity. More specifically, organic pigments, which are excellent in optical characteristics but inferior in heat resistance, cannot be used for color displays including a cathode ray tube which require a heat treatment step. Further, cadmium pigments of the inorganic pigments exhibit good optical characteristics and heat resistance but cannot be used because of its toxicity.

Therefore, as a red pigment for a phosphor coating or color filter of a color display, red iron oxide ($Fe_2O_3$), which is excellent in heat resistance and nontoxic, has to be used though it is somewhat inferior in optical characteristics.

However, since red iron oxide has optical characteristics of greatly absorbing wavelengths within the ultraviolet region, the light exposure to a photoresist is decreased in a step of forming a phosphor layer and the like when the surface of a phosphor is coated therewith or a color filter is formed therewith. In other words, in the formation of a phosphor layer by the photolithography, the phosphor coating film or the color filter containing red iron oxide absorbs a part of ultraviolet rays which are applied to cure a photoresist, thus presenting a problem that the photoresist is not sufficiently irradiated with ultraviolet rays.

Accordingly, a phosphor coating and color filter material is demanded which is excellent in optical characteristics, heat resistance, and non-toxicity, and never interferes with the irradiation of a photoresist with ultraviolet rays in forming a phosphor layer and the like.

The present invention is made to solve these problems and it is an object of the invention is to provide a phosphor or color filter which is excellent in optical characteristics, heat resistance and non-toxicity, and never interferes with the irradiation of a photoresist with ultraviolet rays in forming a phosphor layer and the like.

Further, it is another object of the invention to provide a color display which includes the phosphor or color filter and exhibits good luminous chromaticity and excellent display characteristics such as brightness and contrast.

SUMMARY

A first aspect of the present invention is an oxide composite particle comprising an oxide particle matrix and at least one fine gold particle contained in the oxide particle matrix, wherein a visible light having a specific wavelength is absorbed.

A second aspect of the present invention is an oxide composite particle comprising an oxide particle and at least one fine gold particle fixed on a surface of the oxide particle, wherein a visible light having a specific wavelength is absorbed.

A third aspect of the present invention is a method for producing an oxide composite particle comprising preparing an aqueous dispersion of fine gold particles, adding a surface-active agent and a hydrophobic organic solvent to the aqueous dispersion of the fine gold particles obtained in the previous step to form reverse micelles of the fine gold particles, and adding tetraethoxysilane to the reverse micelles of the fine gold particles formed in the previous step for polymerization.

A fourth aspect of the present invention is a phosphor disposed to form a layer on an inner surface of a panel of a color display, comprising a thin film containing the oxide composite particle as set forth in the first aspect on a surface of a phosphor particle.

A fifth aspect of the present invention is a phosphor disposed to form a layer on an inner surface of a panel of a color display, comprising a thin film containing the oxide composite particle as set forth in the second aspect on a surface of a phosphor particle.

A sixth aspect of the present invention is a method for producing a phosphors comprising adding an organic or inorgapic binder to a suspension of a phosphor to allow the binder to adhere to a surface of a particle of the phosphor, and thereafter adding a dispersion containing the oxide composite particle as set forth in the first aspect thereto and mixing followed by drying to form a thin film containing the oxide composite particle on the surface of the phosphor particle.

A seventh aspect of the present invention is a method for producing a phosphor comprising adding an organic or inorganic binder to a suspension of a phosphor to allow the binder to adhere to a surface of a particle of the phosphor, and thereafter adding a dispersion containing the oxide composite particle as set forth in the second aspect thereto and mixing followed by drying to form a thin film containing the oxide composite particle on the surface of the phosphor particle.

An eighth aspect of the present invention is a color filter comprising filter layers of a plurality of colors arranged in a predetermined pattern on an inner surface of a panel having a light transmission property, characterized in that the filter layer of at least one color is a thin film containing the oxide composite particle as set forth in the first aspect.

A ninth aspect of the present invention is a color filter comprising filter layers of a plurality of colors arranged in a predetermined pattern on an inner surface of a panel having a light transmission property, characterized in that the filter layer of at least one color is a thin film containing the oxide composite particle as set forth in the second aspect.

A tenth aspect of the present invention is a method for manufacturing a color filter comprising adding an organic or inorganic binder to a dispersion containing the oxide composite particle as set forth in the first aspect, thereafter applying a resultant solution onto a panel having a light transmission property followed by drying to form a thin film containing the oxide composite particle.

An eleventh aspect of the present invention is a method for manufacturing a color filter comprising adding an organic or inorganic binder to a dispersion containing the oxide composite particle as set forth in the second aspect, and thereafter applying a resultant solution onto a panel having a light transmission property followed by drying to form a thin film containing the oxide composite particle.

A twelfth aspect of the present invention is a color display comprising a panel having a light transmission property, a light absorbing layer disposed on an inner surface of the panel and a phosphor layer disposed on a rear side opposite to the panel with respect to the light absorbing layer, wherein the phosphor layer includes the phosphor as set forth in the fourth aspect.

A thirteenth aspect of the present invention is a color display comprising a panel having a light transmission property, a light absorbing layer disposed on an inner surface of the panel and a phosphor layer disposed on a rear side opposite to the panel with respect to the light absorbing layer, wherein the phosphor layer includes the phosphor as set forth in the fifth aspect.

A fourteenth aspect of the present invention is a color display comprising a panel having a light transmission property, a light absorbing layer and a color filter respectively disposed on an inner surface of the panel, and a phosphor layer disposed on a rear side opposite to the panel with respect to the color filter, wherein the color filter is the color filter as set forth in the eighth aspect.

A fifteenth aspect of the present invention is a color display comprising a panel having a light transmission property, a light absorbing layer and a color filter respectively disposed on an inner surface of the panel, and a phosphor layer disposed on a rear side opposite to the panel with respect to the color filter, wherein the color filter is the color filter as set forth in the ninth aspect.

In the oxide composite particle of the first aspect of the present invention, at least one fine gold particle is contained in a matrix of an oxide particle, and in the oxide composite particle of the second aspect of the present invention, at least one fine gold particle is fixed on the surface of an oxide particle. In either aspect, since a visible light of a specific wavelength is absorbed, a phosphor can be obtained which is excellent in optical characteristics, heat resistance and non-toxicity by coating the surface of a phosphor particle with the oxide composite particles. Further, the surface of a substrate such as a glass panel is coated with the oxide composite particles to form a thin film, so that a color filter which is excellent in optical characteristics, heat resistance, non-toxicity and the like, can be obtained.

In a thin film singly composed of fine gold particles, the particles aggregate together due to drying or grow to be black. But, the fine gold particle is kept fine in particle diameter without turning to black since the fine gold particles are uniformly dispersed in a thin film composed of the oxide composite particles, so that visible light is kept selectively absorbed.

Further, in the phosphor coated with the oxide composite particles of the present invention and the color filter formed of the oxide composite particles, since the oxide composite particle has optical characteristics that its absorption of light within the ultraviolet region is significantly lower than that of red iron oxide which has been conventionally used as a red pigment, ultraviolet irradiation of a photoresist is never interfered with in forming a phosphor layer and the like, so that the photoresist can be irradiated with a sufficient amount of ultraviolet rays.

BRIEF DESCRIPTION OF THE DRAWINGS

FIG. 6A is a cross-sectional view generally showing the entire configuration, and FIG. 6B is an enlarged cross-sectional view of a phosphor screen.

DETAILED DESCRIPTION OF THE INVENTION

Hereafter, preferred embodiments of the present invention will be explained. It should be noted that the invention is not limited to the following embodiments.

Figure 1:
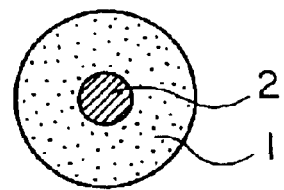
FIG. 1 is a cross-sectional view showing the structure of a gold colloid/oxide composite particle that is a first embodiment of the present invention.

FIG. 1 is a cross-sectional view of an oxide composite particle that is a first embodiment of the invention. This oxide composite particle has a structure in which at least one fine gold particle (gold colloid) 2 is contained in a matrix of an oxide particle 1. Hereafter, a particle having such a structure is referred to as a gold colloid/oxide composite particle.

The diameter of the fine gold particle 2 preferably ranges from 2.5 nm to 35.0 nm. The particle diameter more preferably ranges from 10.0 nm to 30.0 nm, and the most preferably from 10.0 nm to 25.0 nm.

As the oxide constituting the matrix in which the fine gold particle 2 is contained, an oxide transparent to visible light is used. Such possible transparent oxides include silica ($SiO_2$), aluminum oxide ($Al_2O_3$), cerium oxide ($Ce_2O_3$), indium oxide ($In_2O_3$), lanthanum oxide ($La_2O_3$), tin oxide ($SnO_2$), tantalum oxide ($TaO_x$), zinc oxide ($ZnO_2$), titanium oxide ($TiO_2$), yttrium oxide ($Y_2O_3$), zirconium oxide ($ZrO_2$), indium oxide doped with tin (Sn), tin oxide doped with antimony (Sb), tin oxide doped with aluminum (Al). By the way, it is not preferable to use lead oxide, antimony oxide, and hafnium oxide from a viewpoint of a metallic element contained therein exerting adverse effects on the environment.

The diameter of such an oxide particle 1 is preferably larger than that of the above-described fine gold particle 2, equal to or larger than 2.5 nm and equal to or smaller than 80 nm. More preferably, it ranges from 5 nm to 50 nm. When the diameter of the oxide particle 1 exceeds 80 nm, a color filter or the like which is formed of the oxide composite particles looks whitish due to scattering of incident light, and when the particle diameter is equal to or larger than 50 nm, even if smaller than 80 nm, the color filter or the like tends to look clouded.

Next, a method for producing the gold colloid/oxide composite particle having such a structure is explained taking a case of the oxide being silica ($SiO_2$) as an example.

First, a monodisperse gold colloid can be obtained by dropping a trisodium citrate solution into a boiled tetrachloroauric (III) acid solution.

Figure 2:
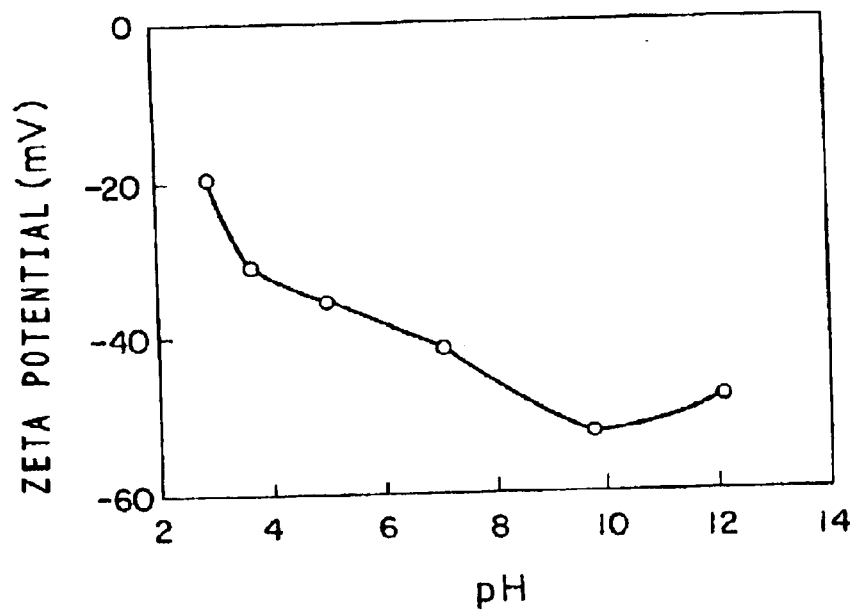
FIG. 2 is a graph representing the zeta potential of the gold colloid.

As shown in FIG. 2, since the equipotential point of the zeta potential of the gold colloid is in the vicinity of pH 2, and the equipotential point of silica being transparent oxide also ranges from pH 2 to pH 3, both gold colloid and silica are negatively charged in a solution having a pH higher than 2. Therefore, the obtained gold colloid solution is dropped into a hydrophobic organic solvent, to which a cationic surface-active agent or a nonionic surface-active agent has been added, to form a reverse micelle of gold colloid covered with the surface-active agent.

Here, the cationic surface-active agents include alkylamine salt, alkyl trimethylammonium salt, dialkyl dimethylammonium salt, alkyl dimethylbenzyl ammonium salt and the like, and the noionic surface-active agents include polyoxyethylene alkyl phenyl ether, polyoxyethylene nonylphenyl ether, polyoxyethylene alkyl ether, polyoxyethylenepolyoxypropylene, polyoxyethyleneblockcopolymer, glycerine fatty acid ester, sorbitan fatty acid ester, sucrose fatty acid ester and the like. It is possible to use cyclohexane, toluene, benzene and the like as the organic solvent which is hydrophobic, that is, insoluble in water.

Subsequently, ammonia solution is dropped as a catalyst into a reverse micelle solution having the gold fine colloids in an aqueous phase, and tetraethoxysilane (TEOS) is dropped thereinto, so that silane polymerizes with the chain part of the surface-active agent on the surface of the reverse micelles to produce silica, thereby obtaining a dispersion of gold colloid/silica composite particles.

For production of a gold colloid/oxide composite particle with a transparent oxide other than silica as a matrix, it is possible to use, in place of tetraethoxysilane, alcoxides of the above-described metals such as titanium tetraethoxide and tin tetraethoxide, or complexes such as acetate, acetylacetonates and the like.

Next, a second embodiment of the present invention is explained.

Figure 3:
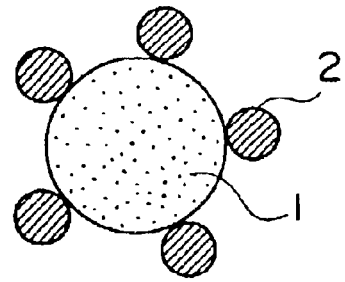
FIG. 3 is a cross-sectional view showing the structure of a golf colloid/oxide support particle that is a second embodiment of the present invention.

An oxide composite particle of the second embodiment has a structure, as shown in FIG. 3, in which at least one fine gold particle (gold colloid) 2 is supported and fixed on the surface of an oxide particle 1. Hereinafter, the particle having such a structure is referred to as a gold colloid/oxide support particle.

The diameter of the fine gold particle 2 preferably ranges from 2.5 nm to 35.0 nm. The particle diameter more preferably ranges from 10.0 nm to 30.0 nm, and the most preferably from 10.0 nm to 25.0 nm.

As the oxide constituting the particle on which the fine gold particle 2 is supported and fixed, an oxide transparent to visible light is used. Such possible transparent oxides include silica ($SiO_2$) aluminum oxide ($Al_2O_3$), cerium oxide ($Ce_2O_3$), indium oxide ($In_2O_3$), lanthanum oxide ($La_2O_3$), tin oxide ($SnO_2$), tantalum oxide ($TaO_x$), zinc oxide ($ZnO_2$), titanium oxide ($TiO_2$), yttrium oxide ($Y_2O_3$), zirconium oxide ($ZrO_2$), indium oxide doped with tin (Sn), tin oxide doped with antimony (Sb), tin oxide doped with aluminum (Al). By the way, it is not preferable to use lead oxide, antimony oxide, and hafnium oxide from a viewpoint of a metallic element contained therein exerting adverse effects on the environment.

The diameter of such an oxide particle 1 is preferably larger than that of the above-described fine gold particle 2, equal to or larger than 2.5 nm and equal to or smaller than 80 nm. More preferably, it ranges from 5 nm to 50 nm. When the diameter of the oxide particle 1 exceeds 80 nm, a color filter or the like which is formed of the oxide support particles looks whitish due to scattering of incident light, and when the particle diameter is equal to or larger than 50 nm, even if smaller than 80 nm, the color filter or the like tends to look clouded.

Next, a method for producing the gold colloid/oxide support particle having such a structure is explained taking a case of the oxide being silica ($SiO_2$) as an example.

First, a hydrazine ($N_2H_4$) solution is dropped into 20 ml of tetrachloroauric (III) acid solution and agitated, and thereafter a hydrophobic organic solvent and a nonionic surface-active agent are added thereto to obtain a dispersion of gold colloids. Further, an ethanol solution of tetraethoxysilane (TEOS) is added to ammonia solution, and thereafter solvent therein is evaporated for concentration.

Next, the concentrated solution containing tetraethoxysilane (TEOS) is added to the dispersion of gold colloids for reaction, the resultant mixed solution is sprayed into liquid nitrogen, followed by vacuum drying, thereby obtaining gold colloid/oxide support particles.

Next, a third and a fourth embodiment of the present invention are explained.

Figure 4:
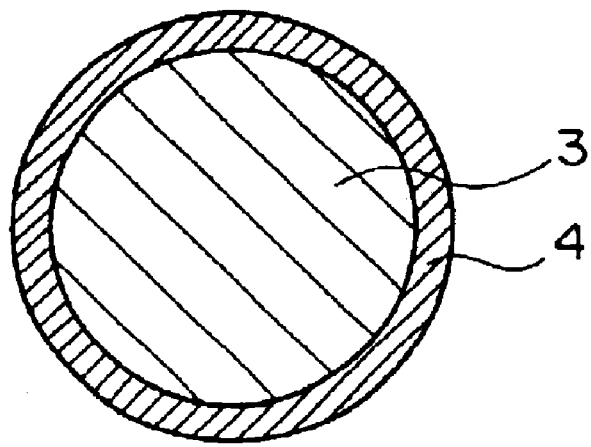
FIG. 4 is a cross-sectional view generally showing the configuration of a phosphor with a surface covered with a coating film composed of a gold colloid/oxide composite particle, which is a third embodiment of the present invention.

FIG. 4 is a cross-sectional view generally showing the structure of a phosphor with a surface coated with oxide composite particles, which is the third embodiment of the present invention.

In this drawing, a numeral 3 denotes a phosphor particle that is a main body on which a coating film 4, which is composed of the above-described gold colloid/silica composite particles according to the first embodiment, is formed.

Note that the coating film 4 may cover only a part of the surface of the phosphor particle 3. The coating film 4 may be composed of the gold colloid/silica support particles according to the second embodiment.

Here, as a phosphor constituting the phosphor particle 3, $Y_2O_3$:Eu, $Y_2O_2S$:Eu, (Y, Gd)$BO_3$:Eu, $YBO_3$:Eu and the like as having red luminescent can be used. It should be noted that since a coating film having optical characteristics other than red can be obtained by controlling the particle diameter of the gold colloid, a usable phosphor is not limited to red one.

The phosphor having such a coating film is produced by a method explained below. Specifically, an organic binder such as a polymer of acrylic acid or styrene, gum arabic, gelatin, polyvinyl alcohol, polyethylene glycol, polyvinyl pyrrolidone, hydroxypropylcellulose or the like, or an inorganic binder such as inorganic silicate, phosphate, aluminate or the like is added to a well-known phosphor suspension (slurry) so that a binder adheres to the surface of the phosphor particle, thereafter a dispersion of the above-described gold colloid/silica composite particles is added thereto and agitated, and then the phosphor is taken out and dried, thereby obtaining a phosphor with a surface covered with a thin film composed of the gold colloid/silica composite particles.

Next, a color filter that is the fourth embodiment of the present invention is explained.

Figure 5:
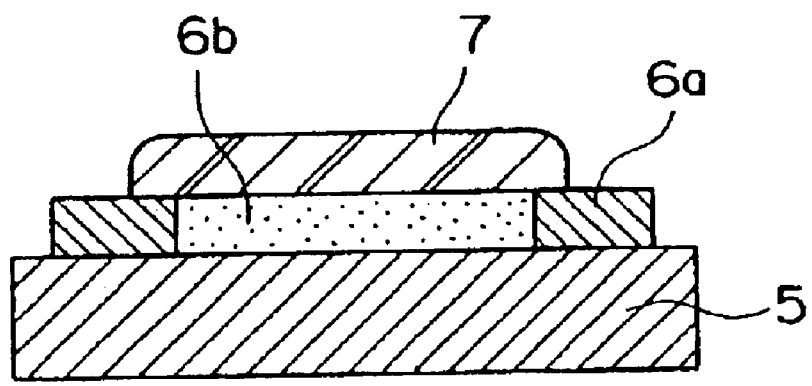
FIG. 5 is a cross-sectional view generally showing the configuration of a color filter for a cathode ray tube, which is a fourth embodiment of the present invention.

FIG. 5 is a cross-sectional view generally showing the structure of a color filter of a cathode ray tube that is the fourth embodiment of the invention.

In the drawing, a numeral 5 denotes a panel of a face plate, a light absorbing layer 6a which is formed as a black matrix and a color filter 6b are arranged respectively on an inner surface of the panel 5, and a phosphor layer 7 of each color of blue, green, red is formed, arranged in dots or stripes, on the color filter 6b. In the color filter 6b, each color filter layer is regularly arranged and formed in holes in predetermined shapes (for example, in circular dots) of the light absorbing layer 6a so as to transmit light of the same color as the luminous color of the phosphor layer 7. In this color filter 6b, at least a filter layer of one color is a thin film composed of the above-described gold colloid/silica composite particles.

For production of such a filter layer, an organic binder such as a polymer of acrylic acid or styrene, gum arabic, gelatin, polyvinyl alcohol, polyethylene glycol, polyvinyl pyrrolidone, hydroxypropylcellulose or the like, or an inorganic binder such as inorganic silicate, phosphate, aluminate or the like is first added to liquid made by concentrating the dispersion of the gold colloid/silica composite particles, which is obtained by the above-described method, thereby preparing a coating solution. Subsequently, a solvent having volatility characteristics suitable for its coating method is added thereto to adjust its concentration, and thereafter applied onto a substrate such as a face panel by a spin coating method, a dip coating method, a screen printing method or the like and dried, thereby forming a filter layer of the color filter.

Further, patterning can be performed by a well-known photolithography method. Specifically, appropriately selected photosensitive components are added to the dispersion of the above-described gold colloid/silica composite particles to prepare a coating solution, which is applied to a panel, dried, and exposed and developed at a predetermined position through a shadow mask, thereby forming a patterned filter layer. Alternatively, patterning can be performed by a bilayer photolithography method of individually laminating and forming photoresist coatings.

In the phosphor of the third embodiment and the color filter of the fourth embodiment formed as described above, a thin film is formed of the gold colloid/silica composite particles. In a thin film singly composed of the gold colloids, the particles aggregate together due to drying or grow to be black, but, in the thin film composed of the gold colloid/silica composite particles, since the gold colloids are dispersed and contained in the matrixes of silica to exist independently from each other, the particle diameter is kept fine so that visible light is kept selectively absorbed in the surface plasmon absorption.

Next, a color cathode ray tube, a field emission display (FED), and a plasma display panel (PDP) are individually explained as examples of color displays having such a phosphor coating film or a color filter.

Figure 6A:
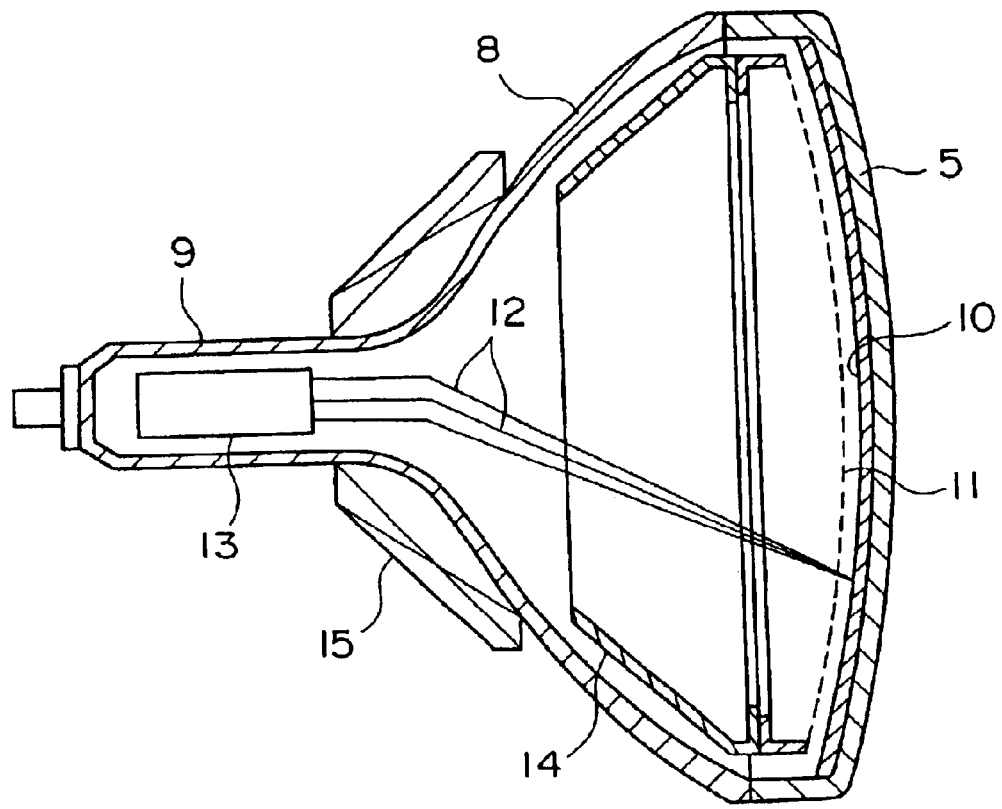
FIGS. 6A and 6B showing a color cathode ray tube that is a first example of a color display of the present invention.
Figure 6B:
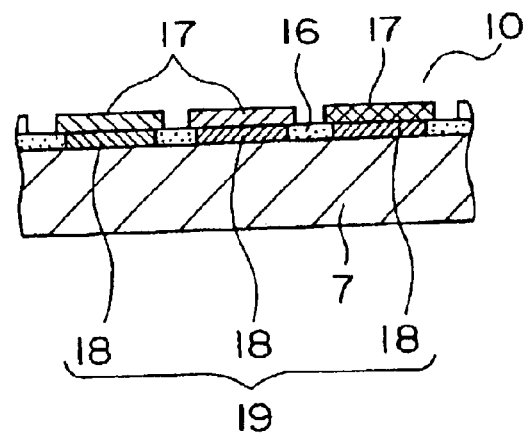

The color cathode ray tube, as shown in FIG. 6A and FIG. 6B respectively, has an envelope which includes a glass panel 5 that is a translucent panel, a funnel 8, and a neck 9. A phosphor screen 10 is provided on the inner surface of the panel 5, and a shadow mask 11 is disposed inside the phosphor screen 10 to be opposed thereto. Inside the neck 9 of the envelope, an electron gun 13 is disposed which emits electron beams 12. Further, inside the funnel 8, an inner shield 14 is disposed which shields the electron beams 12 emitted from the electron gun 13 from an external magnetic field, and outside the funnel 8, a deflector 15 is disposed which deflects the electron beams 12 by a magnetic field generated thereby. The phosphor screen 10 comprises a light absorbing layer 16 formed in a matrix and phosphor layers 17 of respective colors, which are regularly arranged and formed in holes of the light absorbing layer 16, and a color filter 19 having filter layers 18 of colors corresponding to those of luminous color of the phosphor layers 17 is provided between the phosphor layers 17 and the panel 5.

Figure 7:
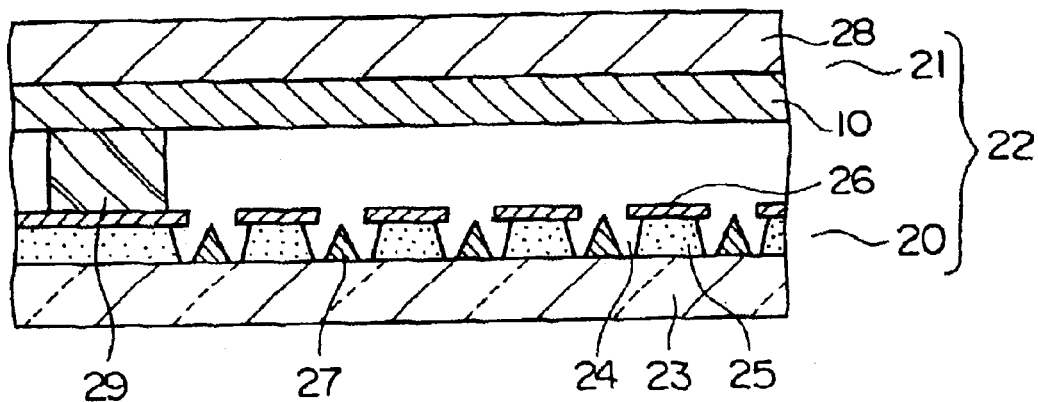
FIG. 7 is a cross-sectional view generally showing the configuration of an FED that is a second example of a color display of the present invention.

In the field emission display (FED) that is a second example of the color display of the present invention, as shown in FIG. 7, a substrate 20 on the side of emitting electrons and a substrate 21 on the side of emitting light are disposed to be opposed to each other in parallel to form a vacuum envelope 22. In the substrate 20 on the electron emitting side, a silicon dioxide film 25 having many cavities 24 is formed on a silicon substrate 23, a gate electrode 26, which is made of molybdenum, niobium or the like, is formed thereon, and electron emitting elements 27, which are made of molybdenum, in cone shape are formed on the silicon substrate 23 inside the cavities 24. In the substrate 21 on the light emitting side, a phosphor screen 10, which comprises a light absorbing layer and phosphor layers of respective colors, is formed on a face opposed to the electron emitting elements 27 of a glass panel 28, and a color filter (not shown) corresponding to luminous colors of the phosphor layers is provided between the phosphor layers and the glass panel 28. Further, to support a load exerted on the silicon substrate 23 by the weight of the glass panel 28 and the like and the atmospheric pressure, a supporting member 29 is disposed between the substrate 20 on the electron emitting side and the substrate 21 on the light emitting side.

Figure 8:
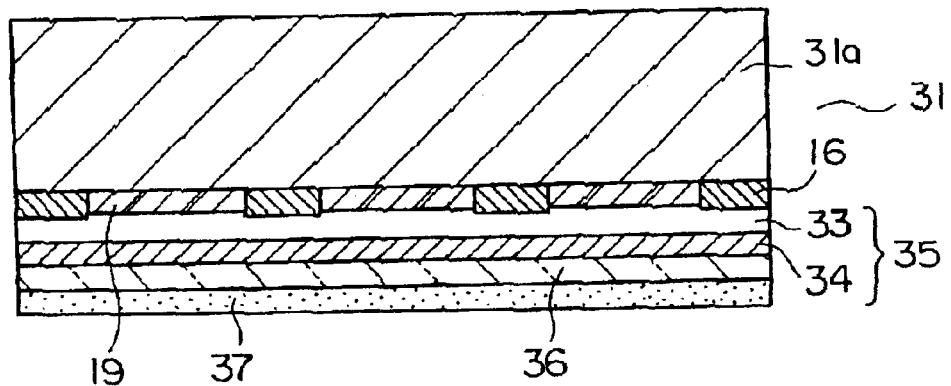
FIG. 8 is a cross-sectional view generally showing a PDP that is a third example of a color display of the present invention.
Figure 8:
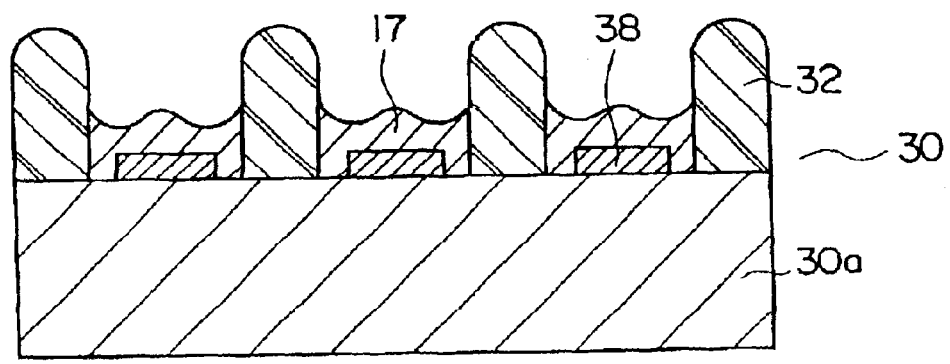

In the AC-type PDP that is a third example of the color display of the present invention, as shown in FIG. 8, a rear substrate 30 and a front substrate 31 are arranged to be opposed to each other in parallel, and both are held with a fixed gap interposed therebetween by a plurality of cell barriers 32 which are arranged on a rear side glass substrate 30a. In the front substrate 31, a light absorbing layer 16 and a color filter 19 are arranged on an inner surface of a front side glass substrate 31a, and composite electrodes 35 are formed thereon, each composed of a transparent electrode 33 being a sustain electrode and a metal electrode 34 being a bus electrode. Further, a dielectric layer 36 is formed covering the composite electrodes 35, and a protective layer 37 is formed thereon. On a front face of the rear side glass substrate 30a, address electrodes 38 are formed to be located between the cell barriers 32 in a manner to be perpendicular to the composite electrodes 35, and phosphor layers 17 are provided in a manner to cover the address electrodes 38.

Figure 9:
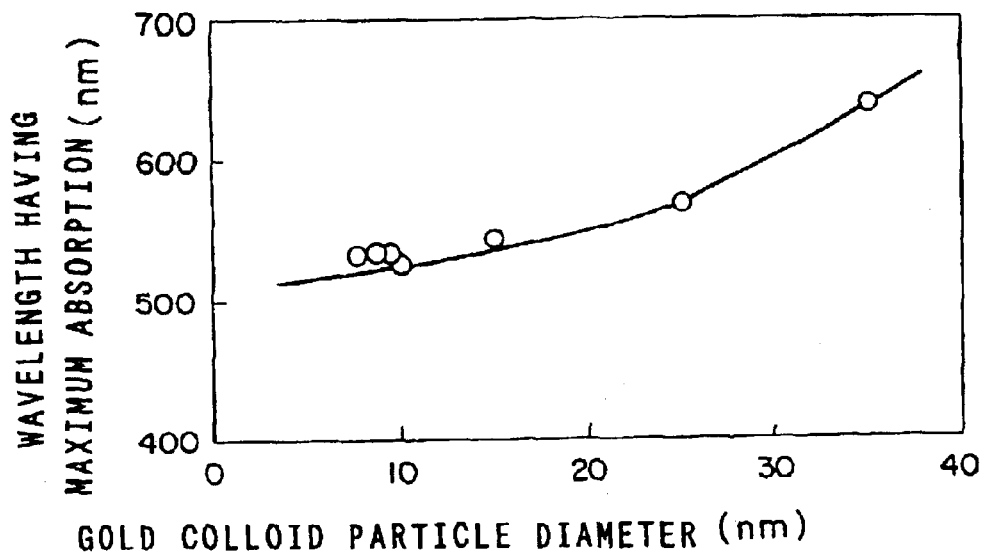
FIG. 9 is a graph presenting the relationship between the particle diameter of the gold colloid and optical characteristics (the wavelength having the maximum absorption) of a thin film composed of a gold colloid/silica composite particle in the present invention.

Next, characteristics of the thin film composed of the gold colloid/silica composite particles, which is used as the coating film of the phosphor or the filter layer of the color filter in the above-described embodiments, are explained according to FIG. 9.

First, the light transmittance spectrum of the aforesaid thin film was measured with the diameter of the gold particle (colloid) changed to obtain the bottom wavelength of this spectrum (the wavelength having the maximum absorption rate). The relationship between the diameter of the gold colloid and the optical characteristics (the wavelength having the maximum absorption) of the thin film composed of the gold colloid/silica composite particles is shown in FIG. 9.

It was confirmed, as in this graph, that when the diameter of the gold colloid is smaller than 2.5 nm, the bottom wavelength (the wavelength having the maximum absorption) is on the side of significantly short wavelength, and thus the thin film becomes yellowish and insufficient in coloring ability. It was also confirmed that when the diameter of the gold colloid is larger than 2.5 nm, the thin film becomes reddish (pink) in color, and that as the particle diameter becomes larger, the bottom wavelength shifts toward a long wavelength side so that the color of the obtained thin film becomes bluish purple. When the diameter of the gold colloid exceeds 50 nm, the thin film becomes brown, and it becomes black when the particle grows to be larger in diameter than the above.

Figure 10:
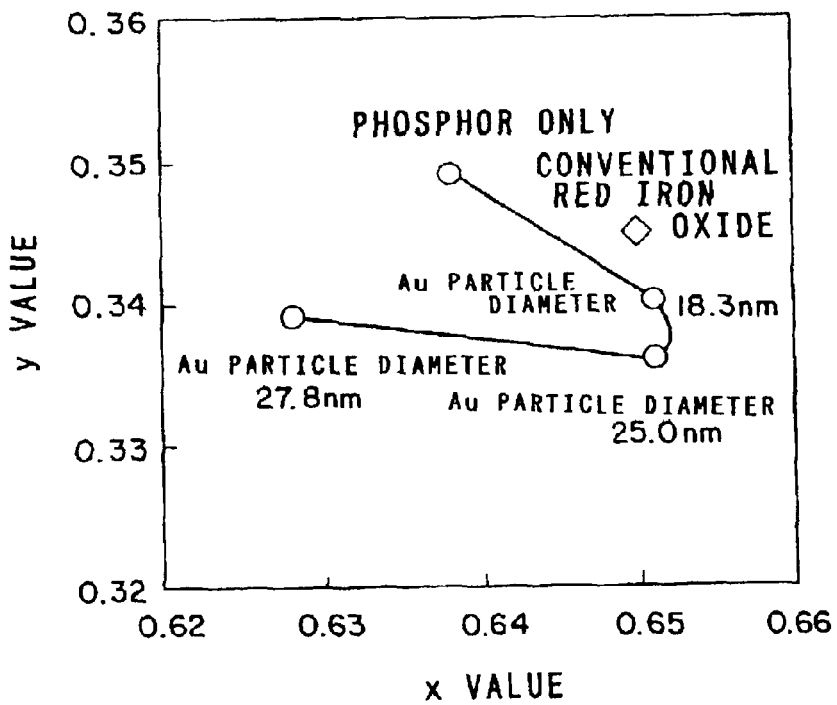
FIG. 10 is a graph presenting the relationship between the particle diameter of the gold colloid and chromaticity characteristics of red luminescence in a color display of the present invention.

Next, the results of measuring chromaticity characteristics of red luminescence with the diameter of the gold colloid changed in the color display having a color filter layer composed of such gold colloid/silica composite particles, are shown in FIG. 10 together with characteristics of a red filter layer which is formed using red iron oxide that is a conventional red pigment.

As in the chromaticity diagram shown in FIG. 10, it was confirmed that as the diameter of the gold colloid is increased, the y value of luminous chromaticity decreases and the x value thereof increases when the particle diameter is equal to or smaller than 25.0 nm, which indicates improved chromaticity characteristics of red. It was confirmed, however, that when the particle diameter of the gold colloid is further increased beyond 25.0 nm, the y value of the chromaticity conversely increases and the x value decreases, which indicates deterioration in chromaticity characteristics.

From the measured results shown in FIG. 9 and FIG. 10, it is found that the particle diameter of the gold colloid preferably ranges from 2.5 nm to 35.0 nm, more preferably from 10.0 nm to 30.0 nm, and the most preferably from 10.0 nm to 25.0 nm. In other words, it is found from the graph in FIG. 9 that the obtained thin film has an effect of coloring, in which the particle diameter of the gold colloid usable as a color filter ranges from 2.5 nm to 35.0 nm, and especially when the particle diameter of the gold colloid ranges from 10.0 nm to 30.0 nm, the thin film is usable as a red filter. Further, it is found from the graph shown in FIG. 10 that the particle diameter of the gold colloid, which has an effect of improving chromaticity characteristics of red luminescence, ranges from 10.0 nm to 25.0 nm.

Figure 11:
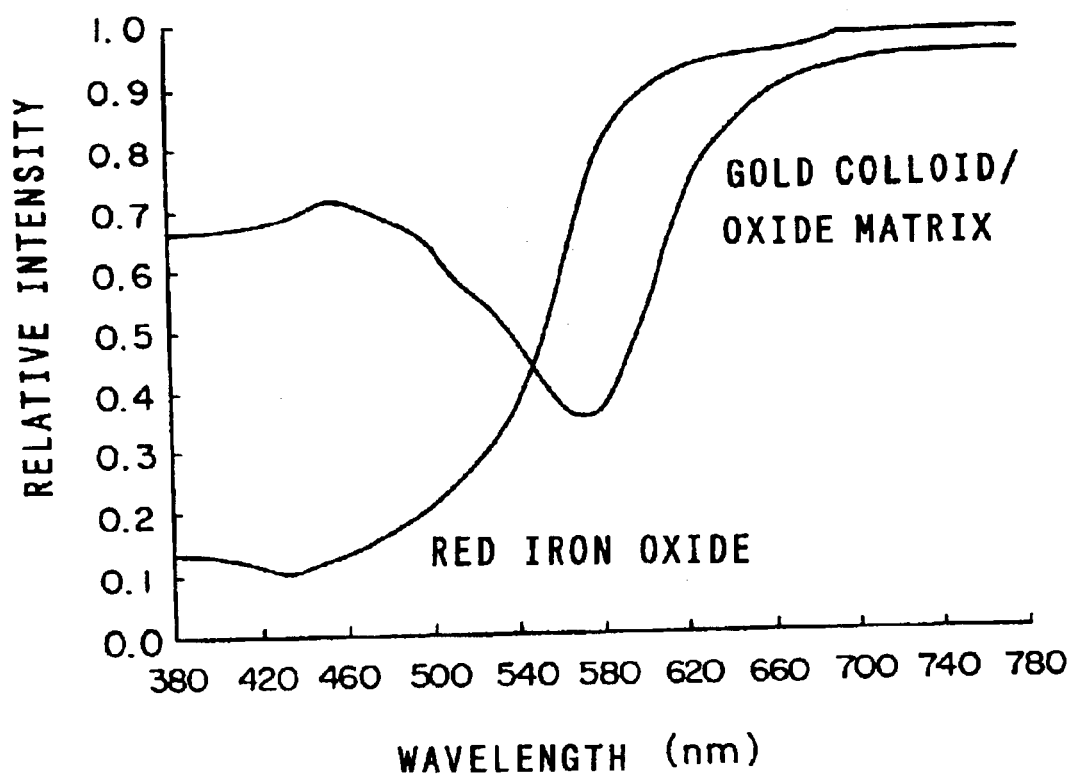
FIG. 11 is a chart presenting the transmittance spectrum of a thin film composed of the gold colloid/silica composite particles and a filter layer formed using red iron oxide.

Furthermore, the transmittance spectrum of the thin film composed of such gold colloid/silica composite particles is shown in FIG. 11 together with the transmittance spectrum of the filter layer formed of red iron oxide. From this drawing, it was confirmed that the transmittance of light within the ultraviolet wavelength region of the thin film composed of the gold colloid/silica composite particles increases to be about five times that of the filter layer composed of red iron oxide, which indicates that the former thin film substantially decreases in absorption of light within the ultraviolet wavelength region as compared to the filter layer composed of red iron oxide.

To clarify such an effect, the irradiance (light exposure) of a photoresist with ultraviolet rays required in a phosphor layer forming step when the thin film composed of red iron oxide and the thin film composed of the gold colloid/silica composite particles are respectively used as a phosphor coating film or a color filter of a color display, are shown in Table 1.

TABLE 1

|  | Phosphor coating | | Color filter | |
|---|---|---|---|---|
|  | Red iron oxide coating | Gold colloid Coating | Red iron oxide thin film | Gold colloid thin film |
| Required exposure | 100% | 60% | 100% | 80% |

It was confirmed, as in Table 1, that the use of the thin film composed of the gold colloid/silica composite particles decreases the light exposure required by the photoresist in forming the phosphor layer for both the phosphor coating film and the color filter, resulting in improved productivity in an exposure step.

It should be noted that the oxide composite particle according to the present invention is suitable for a red phosphor coating film or a red filter. In addition, composite particles having optical characteristics other than red can be obtained since the bottom wavelength of the light transmittance spectrum is changed by controlling the particle diameter of the gold colloid, the molar ratio of the gold colloid to an oxide, or the dielectric constant of the oxide. Therefore, it is possible to obtain phosphor coating films or color filters having various optical characteristics from yellow to bluish green.

Specific embodied examples in which the present invention is applied to displays are explained.

EXAMPLE 1

In the following procedure, a dispersion of composite particles (gold colloid/silica composite particles) in which gold colloids are contained in matrixes of silica particles was prepared, and this dispersion was used to produce a phosphor with a surface formed with a thin film composed of the gold colloid/silica composite particles.

Specifically, 100 ml of $4.8 \times 10^{-4}$ M (mol/l) tetrachloroauric (III) acid ($HAuCl_4$) solution was put into a rounded-bottomed flask and boiled in an oil bath by increasing its temperature to 100° C., and thereafter 1 ml of $2.8 \times 10^{-5}$ M trisodium citrate dihydrate was dropped thereinto. After about one minute and thirty seconds elapsed after the dropping, the solution changed in color to red, which indicated that gold colloids were produced. Subsequently, the rounded-bottomed flask was moved to a cold-water bath to be rapidly cooled. The gold colloid dispersion thus obtained was concentrated by an evaporator into a total volume of 10 ml, to which 10 ml of cyclohexane and 4 ml of polyoxyethylene nonylphenyl ether as a nonionic surface-active agent were respectively added and quickly agitated for five minutes. Further, 7.6 ml of ammonia solution was dropped thereinto and agitated for five to ten minutes. Subsequently, 12 ml of 10% tetraethoxysilane (TEOS)/cyclohexane solution was slowly dropped into the obtained mixture and agitated for 12 hours, and then concentrated by the evaporator, thereby obtaining a dispersion having a high concentration of gold colloid/silica composite particles.

The molar ratio of the gold colloid/silica in the gold colloid/silica composite particle was 2.6% and the particle diameter of the gold colloid was about 8 nm and the particle diameter of silica was about 30 nm. The composite particle was colored in red.

Next, a red phosphor ($Y_2O_2S:Eu$) with a surface processed by aluminate was mixed into the obtained dispersion of the gold colloid/silica composite particles and agitated, and thereafter the phosphor was taken out and dried, thereby obtaining a red phosphor with a surface covered with a thin film composed of the gold colloid/silica composite particles.

Moreover, using this phosphor, a color cathode ray tube was manufactured in the conventional method. Specifically, a face panel, which had been formed with a black matrix (BM) in advance, was prepared, and a blue phosphor (ZnS:Ag, Al), a green phosphor (ZnS:Cu, Al) and the red phosphor covered with the thin film composed of the above-described gold colloid/silica composite particles were individually mixed into water together with PVA, ADC and a surface-active agent and agitated to prepare phosphor slurries of respective colors. Thereafter, the phosphor slurries of the respective colors were applied on the BM of the panel in sequence and dried, and then exposed and developed at predetermined positions through shadow masks to form phosphor layers of the respective colors. Subsequently, a metal back layer was formed on thus formed phosphor layers, and then a funnel was sealed thereto, an electron gun was installed therein and further the inside of the obtained tube was exhausted to complete a color cathode ray tube.

Further, as Comparative Example 1, a red phosphor with a surface coated with red iron oxide was used to manufacture a color cathode ray tube in the similar manner.

Chromaticity characteristics of red luminescence, and display characteristics of brightness and contrast of the color cathode ray tubes thus obtained in Example 1 and Comparative Example 1 respectively, were measured. The measured results are shown in Table 2.

EXAMPLE 2

In the following procedure, composite particles in which gold colloids are supported and fixed on the surface of silica particles (gold colloid/silica support particles) were produced, and the resultant particles were used to produce a phosphor with a surface formed with a thin film composed of the gold colloid/silica support particles.

Specifically, 0.05 ml of 1 M of hydrazine ($N_2H_4$) solution was dropped into 20 ml of $8\times10^{-4}$ M tetrachloroauric (III) acid ($HAuCl_4$) solution and agitated. The obtained solution changed in color to bluish purple, which indicated that gold colloids were produced. Subsequently, 50 ml of isooctane and 5 ml of a nonionic surface-active agent (Ingepal C-52) were individually added to this solution and agitated to obtain a first solution.

On the other hand, 4.36 g of 28% ammonia solution and 26 ml of pure water were mixed and added to 150 ml of ethanol. To this solution, a solution obtained by adding 8.33 g of TEOS to 50 ml of ethanol was slowly added with agitation. Subsequently, the ethanol that is a solvent of this solution was evaporated by the evaporator to be concentrated into a total volume of 50 ml, thereby obtaining a second solution.

Next, the second solution was slowly added to the first solution with agitation and kept agitated for 24 hours. The mixed solution thus obtained was sprayed into liquid nitrogen in a Dewar vessel, and thereafter poured to a stainless tray and held in a vacuum constant temperature bath at 200° C. for 24 hours for vacuum drying. The powder thus obtained was pink fine particles having a particle diameter of the order of several microns. The particle was composed of composite particles having a particle diameter of the order of nanometers which gathered to form porous aggregated spheres and could easily be crushed in a mortar.

Subsequently, a red phosphor ($Y_2O_2S:Eu$) with a surface processed by aluminate was mixed into a dispersion of the gold colloid/silica support particles thus obtained, and the phosphor was taken out after agitation and dried, thereby obtaining a red phosphor with a surface covered with a thin film composed of the gold colloid/silica support particles. Further, using this phosphor, a color cathode ray tube was manufactured similarly to Example 1. Chromaticity characteristics of red luminescence and display characteristics of brightness and contrast of the color cathode ray tube thus obtained in Example 2, were measured respectively. The measured results are shown in Table 2.

TABLE 2

|  | Example 1 | Example 2 | Comparative Example 1 |
| --- | --- | --- | --- |
|  | Color cathode ray tube | | |
| Brightness Red luminescence | 100 | 100 | 100 |
| x value | 0.641 | 0.641 | 0.640 |
| y value | 0.336 | 0.336 | 0.345 |
| Contrast | 103 | 103 | 100 |

EXAMPLE 3

The red phosphor with a surface covered with the gold colloid/silica composite particles produced in Example 1 was used to manufacture a field emission display (FED) as described below. Specifically, on a face plate (glass panel), which had been formed with a BM in advance, a blue phosphor layer, a green phosphor layer and a layer of a red phosphor covered with gold colloid/silica composite particles were formed similarly to Example 1 by patterning at respective predetermined positions, on which a metal back layer was formed. Then, the face plate was sealed to a rear substrate (rear plate) on which electron emitting elements had been formed in advance and the inside thereof was exhausted to complete an FED. Further, as Comparative Example 2, a red phosphor with a surface coated with red iron oxide was used to manufacture an FED in the similar manner.

Chromaticity characteristics of red luminescence, and display characteristics of brightness and contrast of the FEDs thus obtained in Example 3 and Comparative Example 2 respectively, were measured. The measured results are shown in Table 3.

EXAMPLE 4

The red phosphor with a surface covered with the gold colloid/silica composite particles produced in Example 1 was used to manufacture a plasma display as described below. Specifically, a blue phosphor, a green phosphor and the red phosphor covered with the gold colloid/silica composite particles were individually mixed with terpineol and ethyl cellulose and agitated to prepare phosphor pastes. These phosphor pastes were coated by screen printing at respective predetermined positions of a glass substrate, on which cell barriers had been formed, thereby obtaining a rear substrate having a phosphor pattern. Subsequently, this rear substrate was fabricated with a front substrate, on which a BM, a composite electrode, a dielectric layer and a protective layer had been formed to complete a plasma display. Further, as Comparative Example 3, a red phosphor with a surface coated with red iron oxide was used to manufacture a plasma display in the similar manner.

Chromaticity characteristics of red luminescence, and display characteristics of brightness and contrast of the plasma displays thus obtained in Example 4 and Comparative Example 3 respectively, were measured. The measured results are shown in Table 3.

TABLE 3

|  | Example 3 | Comparative Example 2 | Example 4 | Comparative Example 3 |
|---|---|---|---|---|
|  | Field emission display | | Plasma display | |
| Brightness Red luminescence | 100 | 100 | 100 | 100 |
| x value | 0.642 | 0.640 | 0.633 | 0.631 |
| y value | 0.334 | 0.344 | 0.341 | 0.352 |
| Contrast | 102 | 100 | 101 | 100 |

It is found from Table 2 and Table 3 that Examples 1, 2, 3 and 4 improve in contrast as compared to corresponding Comparative Examples 1, 2 and 3, and remarkably improve in chromaticity of red luminescence.

EXAMPLE 5

An appropriately selected sensitizer was added to the dispersion of the gold colloid/silica composite particles used in Example 1 to prepare a red filter coating solution. Then this red filter coating solution and a blue filter coating solution containing a blue pigment (for example, cobalt aluminate ($Al_2O_3$—CoO)) and a green filter coating solution containing a green pigment (for example, $TiO_2$—NiO—CoO—ZnO) which had been prepared by a well-known method were used respectively and patterned by a well-known photolithography method to form a color filter on a face panel with a BM.

Thereafter, similarly to Example 1, phosphor layers and a metal back layer were formed in sequence, a funnel was sealed thereto, an electron gun was installed therein, and then the inside of the obtained tube was exhausted to complete a color cathode ray tube including a color filter. It should be noted that the thin film composed of the gold colloid/silica composite particles remained red without turning to black even by heat treatments in sealing and exhausting steps. Further, as Comparative Example 4, a red filter layer was formed using red iron oxide that is a conventional red pigment to manufacture a color cathode ray tube including a color filter in the similar manner.

Chromaticity characteristics of red luminescence, and display characteristics of brightness and contrast of the color cathode ray tubes thus obtained in Example 5 and Comparative Example 4 respectively, were measured. The measured results are shown in Table 4.

EXAMPLE 6

Using the red filter coating solution, the blue filter coating solution and the green filter coating solution, which are used in Example 5, respectively, filter patterns were formed on a face plate (glass panel) similarly to Example 5, and the resultant panel was used to manufacture a field emission display (FED) including a color filter similarly to Example 3. Further, as Comparative Example 5, a red filter layer was formed using red iron oxide that is a conventional red pigment, and an FED including a color filter was manufactured in the similar manner.

Chromaticity characteristics of red luminescence, and display characteristics of brightness and contrast of the FEDs thus obtained in Example 6 and Comparative Example 5 respectively, were measured. The measured results are shown in Table 4.

EXAMPLE 7

Using the red filter coating solution, the blue filter coating solution and the green filter coating solution, which are used in Example 5, respectively, filter patterns were formed on an inner surface of a glass substrate on the front side similarly to Example 5, and the resultant substrate was used as a front substrate to manufacture a plasma display including a color filter similarly to Example 4. Further, as Comparative Example 6, a red filter layer was formed using red iron oxide that is a conventional red pigment, and a plasma display including a color filter was manufactured in the similar manner.

Chromaticity characteristics of red luminescence, and display characteristics of brightness and contrast of the plasma displays thus obtained in Example 7 and Comparative Example 6 respectively, were measured. The measured results are shown in Table 4.

TABLE 4

|  | Example 5 | Comparative Example 4 | Example 6 | Comparative Example 5 | Example 7 | Comparative Example 6 |
|---|---|---|---|---|---|---|
|  | Color cathode ray tube | | Field emission display | | Plasma display | |
| Brightness Red | 100 | 100 | 100 | 100 | 100 | 100 |

TABLE 4-continued

| luminescence | Example 5 | Comparative Example 4 | Example 6 | Comparative Example 5 | Example 7 | Comparative Example 6 |
|---|---|---|---|---|---|---|
| x value | 0.651 | 0.650 | 0.651 | 0.649 | 0.642 | 0.640 |
| y value | 0.336 | 0.345 | 0.336 | 0.344 | 0.344 | 0.353 |
| Contrast | 103 | 100 | 104 | 100 | 101 | 100 |

It is found from Table 4 that Example 5, 6 and 7 improve in contrast as compared to corresponding Comparative Examples 4, 5 and 6, and remarkably improve in chromaticity of red luminescence.

INDUSTRIAL APPLICABILITY

As has been described, the gold colloid/silica composite particle of the present invention contains no toxic substance that causes an environmental problem and is excellent in optical characteristics and heat resistance, so that a phosphor or a color filter which is excellent in optical characteristics, heat resistance and non-toxicity can be obtained. Further, a color display can be obtained which includes such a phosphor or color filter and is excellent in luminous chromaticity characteristics and display characteristics of brightness and contrast. Therefore, the gold colloid/silica composite particle of the invention has extremely great industrial value.

What is claimed is:

1. A method for producing coated phosphor particles, comprising:
    preparing an aqueous dispersion containing fine gold particles;
    adding a surface-active agent and a hydrophobic organic solvent to the aqueous dispersion of the fine gold particles obtained in the previous step to form reverse micelles of the fine gold particles;
    adding tetraethoxysilane to the reverse micelles of the fine gold particles, wherein polymerization is carried out to produce a dispersion comprising gold colloid/oxide composite particles;
    adding an organic or inorganic binder to a suspension of phosphor particles to allow the binder to adhere to surfaces of the phosphor particles; and thereafter
    adding the dispersion containing the gold colloid/oxide composite particles thereto, and
    mixing followed by drying to form a thin film containing the gold colloid/oxide composite particles on at least part of the surface of each of the phosphor particles.

2. A color display, comprising:
    a panel having a light transmission property;
    a light absorbing layer disposed on an inner surface of the panel; and
    a phosphor layer disposed on a rear side opposite to the panel with respect to the light absorbing layer, the phosphor layer comprising the coated phosphor particles produced according to claim 1.

3. The method according to claim 1, wherein the surface-active agent is a cationic or nonionic surface-active agent.

4. The method according to claim 3, wherein ammonia solution is added to catalyze said polymerization.

5. A color display, comprising:
    a panel having a light transmission property;
    a light absorbing layer disposed on an inner surface of the panel; and
    a phosphor layer disposed on a rear side opposite to the panel with respect to the light absorbing layer, the phosphor layer comprising the coated phosphor particles produced according to claim 3.

6. A method for producing coated phosphor particles, comprising:
    preparing an aqueous dispersion containing fine gold particles;
    adding a surface-active agent and a hydrophobic organic solvent to the aqueous dispersion of the fine gold particles obtained in the previous step to form reverse micelles of the fine gold particles;
    adding at least one compound selected from the group consisting of alcoxides, acetates, and complexes of titanium or tin to the reverse micelles of the fine gold particles, wherein polymerization is carded out to produce a dispersion comprising gold colloid/oxide composite particles;
    adding an organic or inorganic binder to a suspension of phosphor particles to allow the binder to adhere to surfaces of the phosphor particles; and thereafter
    adding the dispersion containing the gold colloid/oxide composite particles thereto, and
    mixing followed by drying to form a thin film containing the gold colloid/oxide composite particles on at least part of the surface of each of the phosphor particles.

7. The method for producing coated phosphor particles as set forth in claim 1, wherein the at least one compound is titanium tetraethoxide or tin tetraethoxide.

8. A color display, comprising:
    a panel having a light transmission property;
    a light absorbing layer disposed on an inner surface of the panel; and
    a phosphor layer disposed on a rear side opposite to the panel with respect to the light absorbing layer, the phosphor layer comprising the coated phosphor particles produced according to claim 6.

9. The method according to claim 6, wherein the surface-active agent is a cationic or nonionic surface-active agent.

10. The method according to claim 9, wherein ammonia solution is added to catalyze said polymerization.

11. A color display, comprising:
    a panel having a light transmission property;
    a light absorbing layer disposed on an inner surface of the panel; and
    a phosphor layer disposed on a rear side opposite to the panel with respect to the light absorbing layer, the phosphor layer comprising the coated phosphor particles produced according to claim 9.

* * * * *